May 30, 1933.    S. N. TEVANDER    1,911,406
FERRULE FOR IMPLEMENT HANDLES
Filed Nov. 22, 1928
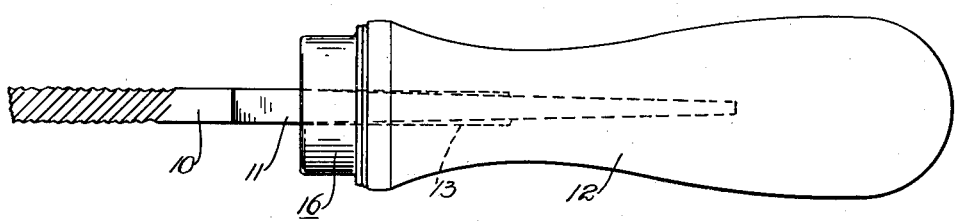
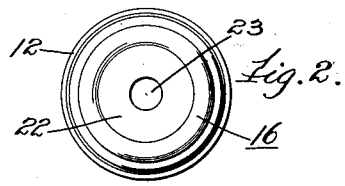
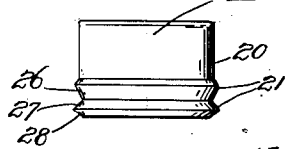
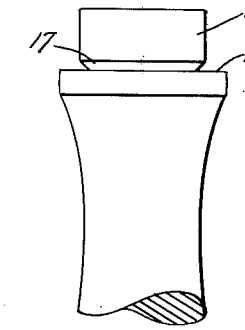
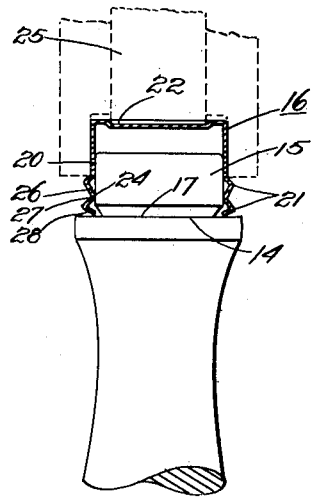
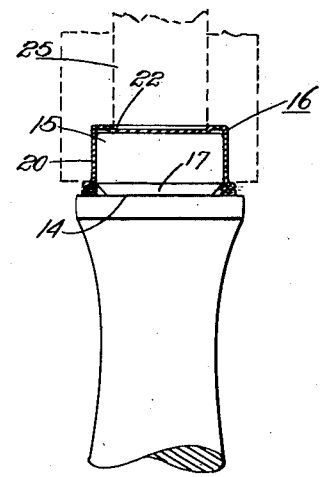
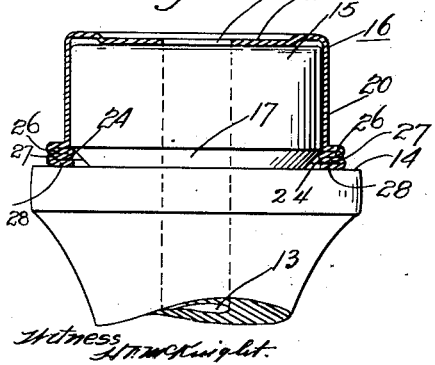
Inventor.
Sven N. Tevander.
by
his Attorneys.

Patented May 30, 1933

1,911,406

UNITED STATES PATENT OFFICE

SWAN N. TEVANDER, OF MAYWOOD, ILLINOIS

FERRULE FOR IMPLEMENT HANDLES

Application filed November 22, 1928. Serial No. 321,252.

This invention relates to a ferrule for an implement handle of material such as wood and has for an object to provide a ferrule of improved, simplified construction, capable of quick and easy application to the handle. Another object is to provide means for securing the ferrule on the handle in an improved manner. It is also an object of this invention to provide a ferrule adapted to adequately reinforce the implement handle more effectively than prior devices of this character. The invention consists in certain features and elements of construction, herein shown and described, as indicated by the claims.

In the drawing:—

Figure 1 is a view showing a fragmentary portion of a tool mounted in a handle which is provided with a ferrule embodying this invention.

Figure 2 is an end view of the ferrule in place on the handle, with the tool omitted.

Figures 3, 4 and 5 are views showing the successive steps in the process of applying the ferrule to a handle.

Figure 6 is an enlarged view of a portion of the handle with the ferrule secured thereto and shown in section to disclose certain features of construction.

The present invention is adapted for handles of tools, kitchen utensils, etc., and as illustrated in the drawing a portion of a file, 10, is shown with its shank, 11, inserted in a handle, 12. Ordinarily the handle is provided with a hole, 13, opening at the forward end to receive the shank in the handle. The handle may be of any suitable material such as wood, having its forward end shouldered at 14, to form a reduced cylindrical portion, 15, on which is mounted my improved ferrule, 16. An annular tapered groove, 17, is formed in the periphery of the reduced portion adjacent the shoulder, 14, to co-operate with certain features of the ferrule for securing it tightly on the reduced handle portion.

The ferrule is of pliable metal drawn by suitable dies to form a thimble of cylindrical shape closed at one end. Formed in the lower portion of the skirt, 20, is a series of beads or open annular corrugations, 21, and in the closed end is a central depressed portion, 22, which is provided with a hole, 23, which is made at the same time hole, 13, is drilled in the handle, to permit insertion of the implement shank therein. Inasmuch as the size of shanks of different implements may vary considerably, the hole, 13, need not be drilled into the handle until after the closed ferrule is mounted thereon and the size of the implement shank to which it is to be applied, is known. The inner bend, 24, and the free edge of the ferrule are formed to substantially the same inside diameter as the upper part of the ferrule so as to snugly fit around the reduced handle portion when applied thereto as shown in Figure 4.

A suitable pressure tool, such as indicated in dotted lines at 25 is used to force the ferrule axially on the reduced portion, 15, compressing the annular corrugations as shown in Figures 4 and 5. The oppositely extending leg portions, 26 and 27, of the corrugations which are connected at the inner bend, 24, are of unequal width, the leg portion, 26, being shown as the wider of the two.

The compressive action of the annular corrugations is substantially as follows:

When the ferrule is mounted as in Figure 4, and pressure is applied to the tool, 25, the free edge of the ferrule being in contact with the shoulder, 14, of the handle with the leg, 28, of the lower corrugation inclined with respect to said shoulder, the free edge is caused to slide cam-wise inwardly, toward the axis, reducing its internal diameter until the said leg, 28, rests flat against the handle shoulder, surrounding the groove, 17. At this position the inner bend, 24, is adjacent the outer edge of the groove, 17, and continued pressure of the tool, 25, causes leg portions, 26 and 27, to collapse (as a toggle link) forcing the inner bend, 24, inwardly into the groove permanently reducing its internal diameter, and thus locking the ferrule on the reduced handle portion. The ferrule is additionally secured by this forced engagement of the inner bend against the tapered wall of the groove, which tends to draw the ferrule down toward the shoulder, 14. When the corrugations have been collapsed or compressed they form in effect a solid annular flange of metal which stiffens and reenforces the ferrule against bursting due to wedging strains as the implement tang is forced into the handle under the stress of its work.

It is to be understood that the groove in the reduced handle portion need not be formed therein in advance, when using handles of soft wood, because the construction of the ferrule is such that it will cut or press its own groove when secured to the cylindrical portion of the handle.

The closed end of the ferrule increases the strength of the skirt portion and insures against splitting of the handle upon insertion of the implement shank therein. The closed end of the ferrule is stiffened and reinforced by the depression at 22. The depressed area insures proper mounting of the ferrule on the reduced portion, 15, by abutting against a central area of the end of said reduced portion, thus preventing the end of the ferrule from contacting with the outer edge of the end of said reduced portion, 15, as shown in Figure 6. Any irregularity in the periphery at the end of the reduced portion such as might result from its being cut at an angle would prevent proper seating of the ferrule but this will be compensated for to some degree by the yielding of the depressed portion, 22, tending to adapt itself to the plane of the end of the handle.

It may be understood that while the leg, 26, of the upper corrugation is shown longer than the leg above it to insure that the internal diameter at the inner bend, 24, shall be reduced to something less than the diameter of the cylindrical portion, 20, this difference in the length of the two legs is not essential. Starting with a corrugated shell as shown in Figure 4, it will be evident that the collapsing of the corrugations as indicated in Figure 5 will tend to stretch the metal at the outer bends of the corrugations and the resistance of the metal to such stretching will tend to force the inner bend inwardly, causing it to grip the tool handle more firmly than before the collapse of the corrugations. The specific structure illustrated is deemed more effective, especially in conjunction with the under-cut groove, 17.

I claim:—

1. The method of securing a ferrule to an implement handle which includes forming the handle with a cylindrical terminal portion and a transaxial shoulder adjacent said portion and extending outwardly therefrom, providing a sheet metal shell having a corrugated skirt portion dimensioned to fit snugly over said cylindrical part, placing said shell on the cylindrical terminal of the handle with the skirt stopped against the shoulder, and applying pressure to the skirt in axial direction, thereby closing its corrugations and reducing their internal diameter for gripping the cylindrical part of the handle.

2. The method of securing a ferrule to an implement handle which includes forming the handle with a cylindrical terminal portion and with an annular groove in said portion, providing a sheet metal shell having a corrugated skirt portion dimensioned to fit snugly over said cylindrical part, placing the shell on the cylindrical terminal of the handle and applying pressure to the skirt in axial direction sufficiently to close its corrugations and reduce their internal diameter, thereby causing one or more of said corrugations to enter the groove for locking the ferrule onto the handle.

3. An implement handle of such material as to require protection of the end thereof by a ferrule and which is provided with a cylindrical ferrule receiving reduction providing a ferrule locating shoulder in combination with a reinforcing ferrule having flat corrugations or contacting ribs providing an inward projection at the inner end of the ferrule of less diameter than the body of the ferrule to closely engage the said cylindrical portion.

4. A ferrule and handle combination as defined in claim 3, in which the ferrule receiving cylindrical extension is grooved to receive the inward projection of the corrugated shoulder.

SWAN N. TEVANDER.